United States Patent
Proctor, Jr. et al.

(10) Patent No.: US 6,421,336 B1
(45) Date of Patent: Jul. 16, 2002

(54) VARIABLE RATE ORTHOGONALLY CODED REVERSE LINK STRUCTURE

(75) Inventors: James A. Proctor, Jr.; John E. Hoffmann; Antoine J. Rouphael, all of Indialantic, FL (US)

(73) Assignee: Tantivy Communications, Inc., Melbourne, FL (US)

(*) Notice: Subject to any disclaimer, the term of this patent is extended or adjusted under 35 U.S.C. 154(b) by 0 days.

(21) Appl. No.: 09/313,684

(22) Filed: May 18, 1999

Related U.S. Application Data

(63) Continuation-in-part of application No. 09/255,956, filed on Feb. 23, 1999, now Pat. No. 6,212,220.

(51) Int. Cl.[7] .............................................. H04B 15/00

(52) U.S. Cl. ........................ 370/342; 370/206; 375/130

(58) Field of Search ................................ 370/203, 206, 370/208, 209, 335, 342, 441; 375/130, 135, 140, 146; 455/63, 65

(56) References Cited

U.S. PATENT DOCUMENTS

| | | | |
|---|---|---|---|
| 4,460,992 A | 7/1984 | Gutleber | |
| 5,103,459 A | 4/1992 | Gilhousen et al. | |
| 6,167,056 A | * 12/2000 | Miller et al. | 370/335 |

* cited by examiner

*Primary Examiner*—Lester G. Kincaid
(74) *Attorney, Agent, or Firm*—Hamilton, Brook, Smith & Reynolds, P.C.

(57) ABSTRACT

A method and apparatus for creating non-interfering coded signals to be simultaneously transmitted over a common frequency in a wireless communication systems, such as a CDMA system, at various data rates and without the use of orthogonal codes and/or orthogonal code generation techniques. The system provides cascaded arrangement of code modulations which each include a channel sequence combiner and selector. The channel sequence combiner receives an input signal and a repetitive maximum length channel sequence and combines these signals to produce a combined signal. The selector receives the input signal, the combined signal, and a repetitive strobe signal, and selects either the input signal or the combined signal to produce an encoded signal based upon a value of the repetitive strobe signal.

10 Claims, 6 Drawing Sheets

| PN SEQUENCE | 1 | 0 | 1 | 1 | 1 | 0 | 0 | 0 | 0 | 1 | 0 | 0 | 1 | 1 | 1 | 0 |
|---|---|---|---|---|---|---|---|---|---|---|---|---|---|---|---|---|
| CHANNEL 1 CODE | 1 | 1 | 1 | 1 | 1 | 1 | 1 | 1 | 1 | 1 | 1 | 1 | 1 | 1 | 1 | X |
| BIT STROBE 1 | 0 | 0 | 0 | 1 | 0 | 0 | 1 | 0 | 0 | 0 | 0 | 0 | 0 | 1 | 0 | 0 |
| BIT STROBE 2 | 0 | 0 | 0 | 0 | 0 | 0 | 0 | 0 | 0 | 0 | 1 | 1 | 1 | 1 | 1 | 0 |
| BIT STROBE 3 | 0 | 0 | 0 | 0 | 0 | 0 | 0 | 0 | 0 | 0 | 0 | 0 | 0 | 0 | 0 | 1 |

FIG. 4

VARIABLE RATE ORTHOGONALLY CODED REVERSE LINK STRUCTURE

CROSS REFERENCE TO RELATED APPLICATION

This application is a continuation-in-part of a prior U.S. patent application Ser. No. 09/255,956 filed Feb. 23, 1999 now U.S. Pat. No. 6,212,220, entitled "Method and Apparatus for Creating Non-Interfering Signals Using Non-Orthogonal Techniques", the entire teachings of which are incorporated herein by reference.

FIELD OF THE INVENTION

This invention relates generally to wireless communication systems, and more particularly to a mechanism for providing variable data rate connections to different users of a Code Division Multiple Access (CDMA) system.

BACKGROUND OF THE INVENTION

The first generation of personal wireless communication devices, such as cellular telephones, operated on an analog transmission principle using a pair of frequencies per transmission session (sending and receiving) per user. Shortly after analog cellular devices became popular, digital cellular devices were perfected and appeared in the marketplace. Digital cellular devices operate by modulating a digitized voice signal onto a carrier wave. Since the signal is digital, certain techniques can then be used to allow multiple users to access the same frequency spectrum at the same time, thereby effectively increasing system capacity.

One such technique, called Code Division Multiple Access (CDMA), provides a multiple access technique that offers certain benefits over analog cellular transmission techniques. In CDMA, two users may communicate simultaneously using one or more of the same radio frequencies. Each user's signal is encoded with a unique pseudorandom noise (PN) code at the transmitter in such a way that it can be properly decoded at a receiver with minimal interference to other user signals.

Certain types of interference problems however still exist in CDMA systems. For instance, standard PN codes in and of themselves are not perfectly orthogonal. Thus, using only PN standard codes results in at least some interference between user channels.

In addition, cellular telephones operate at radio frequencies where a fading characteristic occurs when a transmission signal is reflected from many different features of the physical transmission environment. As a result, a transmitted signal may actually be fragmented and arrives at the destination receiver from many directions. These effects can result in destructive summation of the signals, otherwise known as multi-path fading.

Certain modulation techniques can be used to mitigate the adverse effects of interference and multipath fading, while exploiting frequency reuse advantages. One such prior art modulation technique widely implemented in CDMA systems uses mathematically orthogonal codes such as Walsh codes. Using this technique, a digital data signal to be transmitted is first modulated with a pseudorandom noise (PN) code. The resulting signal is then modulated with an orthogonal Walsh code to create a user signal which is orthogonal to other user signals. The Walsh codes are mathematically interrelated such that as long as the coding rate of each channel is the same, different user channels are non-interfering when transmitted on the same frequency.

The benefits of CDMA systems include a decreased requirement for transmission power which results in longer battery life, increased clarity, higher radio frequency re-use, and favorable signal-to-noise ratio results. Since the frequency spectrum can be reused multiple times in such systems, an overall increase in system user capacity also results.

SUMMARY OF THE INVENTION

The present invention provides a mechanism to achieve similar results as described above without a fixed rate orthogonal code generator or exact rate orthogonal codes for each channel. Instead, a combination of procedures referred to herein as channel sequencing and bit strobing are used to produce two or more resultant signals that do not interfere with one another when transmitted on the same frequency even at different coding rates. That is, the resultant signals appear to be, and actually are, orthogonal to one another. However, these resultant signals need not be at the same predetermined fixed coding rate, nor is it necessary to use orthogonal Walsh codes.

The invention instead provides for a rolling selection of PN codes such that a resultant signal is "double PN" modulated. The resultant signal can be transmitted without interference most of the time. However, at times when the value of the rolling channel would produce a double modulated resultant signal that is in an interfering or non-orthogonal state with another users resultant signal, a strobe signal is used to alter the selection of the resultant signal. The strobe signal essentially reverts to selecting the original singly modulated information signal, instead of the double modulated signal.

To provide for the ability to generate non-interfering signals at different coding rates, multiple code modulators are connected in a cascading arrangement. The cascaded arrangement produces output signals such that different output points in the cascade provided with different code rates. All output points in the cascade arrangement generate signals that are orthogonal with each other.

As a result, the coding rates for different users may be individually assigned. By so permitting the customized selection of coding rates for particular users, the affect is that the spreading gain can be also selected for on-a-per-user basis while guaranteeing orthogonality. Thus, for example, users that are communicating over a shorter distance in a cell may use higher data rates with higher coding rates while at the same time users in the same cell at a farther distance out and/or requiring slower data rates may be assigned slower codes. This provides an additional degree of freedom to the system designer in allocating system capacity to users, which previously heretofore has not been available in orthogonally-coded systems.

In one preferred embodiment, the invention provides a system and method for modulating an information signal in a spread spectrum communication system, such as a CDMA communication system. An input information signal to be transmitted can be a digitized voice signal or a data signal generated by a device such as a telephone or modem. A first pseudorandom combiner receives the input information signal and a pseudorandom code sequence. The pseudorandom combiner combines the information signal with the pseudorandom code sequence to produce a first combined signal. The first combined signal alone may be used at certain times as the resultant signal, without further modulation.

A code modulator then operates on the first combined signal to complement the second tier of PN modulation. The code modulator consists of a channel sequence combiner and selector.

The channel sequence combiner receives the first combined signal which includes the information signal in a modulated form. The channel sequence combiner also receives a repetitive maximum length channel sequence. The repetitive maximum length channel sequence is a pseudorandom sequence and not an orthogonal code. The channel sequence combiner combines the first combined signal with the repetitive maximum length channel sequence to produce a second combined signal.

The selector is coupled to receive the first combined signal, the second combined signal and a repetitive strobe signal. The selector selects one of either the first combined signal or the second combined signal to produce a modulated signal based upon a value of the repetitive strobe signal. The repetitive period of the strobe signal is one chip or clock cycle greater in length than the repetitive maximum length channel sequence. As governed by the repetitive strobe signal, there are times when the system of the invention transmits just the first combined signal, instead of the second combined signal which requires the second modulation process.

A cascading arrangement of the code modulators is then provided to achieve the ability to generate non-interfering signals at different coding rates. For example, a three-tiered cascade arrangement provides an output signal that can be selected from as many as one hundred twenty-eight (128) non-interfering signals. Each of the cascaded code modulators operates as the individual code modulator described above, but each is connected in a serial cascading manner so that its respective output signal is received as input to the next following signal generator, and so forth. This provides a hierarchical or cascading arrangement of code modulators in which different levels in the cascade provide different data rates. In addition, all signals generated are non-interfering with one another and none are generated by using orthogonal codes, such as Walsh codes or independent orthogonal code generators.

BRIEF DESCRIPTION OF THE DRAWINGS

The following and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a chart illustrating a particular example of how different code rates are produced.

DETAILED DESCRIPTION OF THE INVENTION

Figure 1:
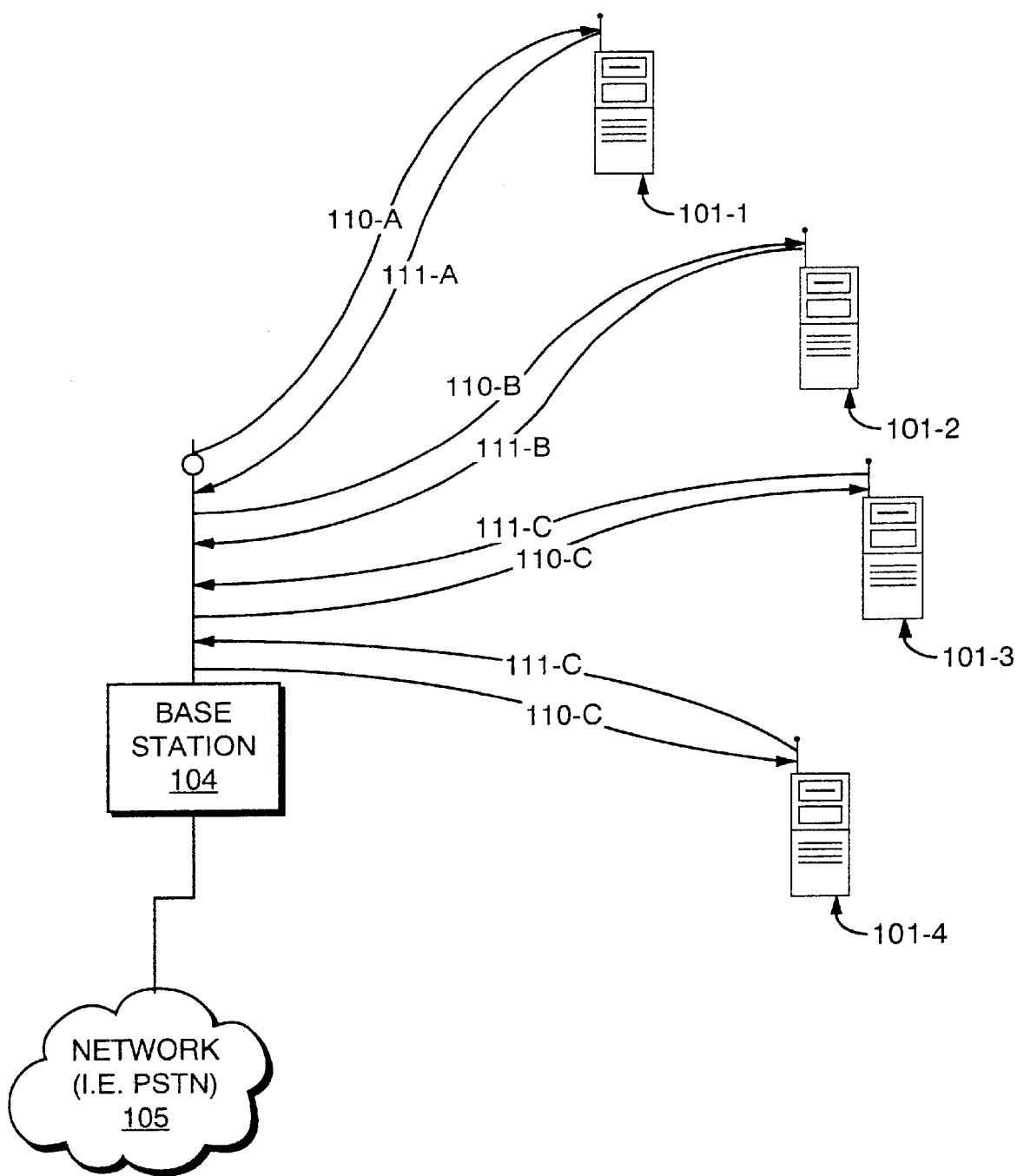
FIG. 1 illustrates a communications system in which the present invention may be implemented.

FIG. 1 illustrates a typical multiple access mobile communications system 100 that includes mobile subscriber units 101-1, 101-2, 101-3 and 101-4 (collectively the subscribers 101) as well as one or more base stations 104. These components provide the functions necessary in order to achieve the desired implementation of the invention. The subscriber units 101 provide wireless data (which may include video data, facsimile data, and/or modem data) and/or voice services and can connect devices such as, for example, laptop computers, portable computers, personal digital assistants (PDAs), or the like through base station 104 to a network 105. Network 105 may be a Public Switch Telephone Network (PSTN), an ISDN network or other circuit-switched network, or may be a connectionless packet based computer network such as the Internet. The subscriber units 101 may be mobile in nature and may travel from one location to another while communicating in a wireless manner with the base station 104 using the radio frequency transmission techniques of this invention.

A single base station 104 and four mobile subscribers units 101 are shown by way of example only, for ease of description of the invention. The invention is applicable to systems in which there are typically many more subscriber units 101 communicating with one or more, and typically many, base stations 104.

The wireless communications systems 100 to which this invention may be applied are systems that use such techniques as CDMA, TDMA, GSM or other systems where more than one subscriber signal is to be simultaneously transmitted over a common frequency. Preferably, the invention is applied in a CDMA-like system which uses protocols similar to that specified by the Telecommunications Industry Association (TIA) IS-95 or the newly emerging IS-95B standards. However, the invention is applicable to any communication systems using multiple access techniques.

In order to provide data and/or voice communication between the subscriber units 101 and the base station 104, wireless transmission of data over a limited number of radio frequency channel resources is provided via forward communication channels 110-1 through 110-4, and reverse communication channels 111-1 through 111-4. The invention provides a way to encode the forward and reverse link signals 110, 111 such that during simultaneous transmission of any two of such signals on the same frequency, the signals 110, 111 will be non-interfering or orthogonal in nature. The invention accomplishes this without using orthogonal code generators and/or orthogonal codes to generate the signals.

Figure 2:
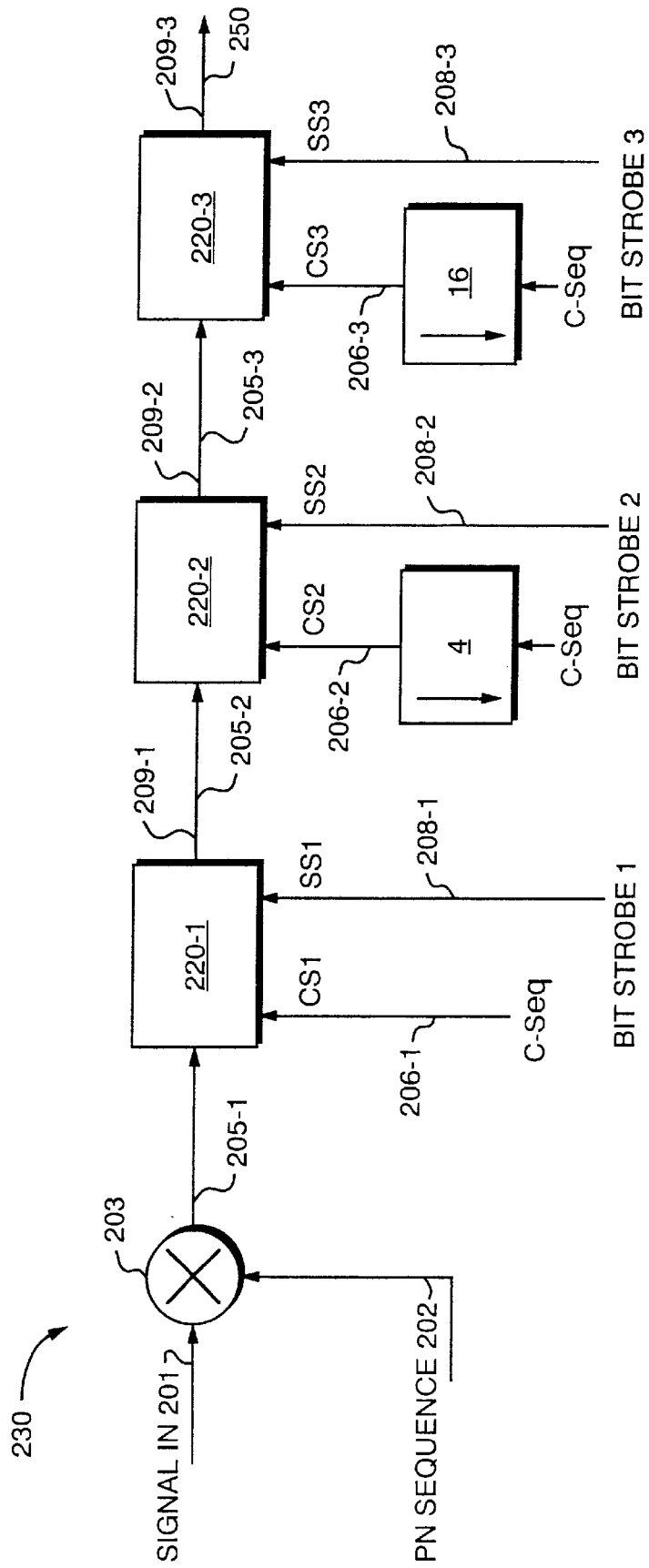
FIG. 2 is a block diagram of a first stage coded signal generator according to this invention.

FIG. 2 illustrates a block diagram of a preferred embodiment of the basic coded signal generator 230 which generates an orthogonalized signal without the use of an orthogonal code generator and/or orthogonal codes. An input digital signal 201, which represents a signal containing user data (or digitized voice) to be transmitted, is input to a combiner 203. Also input into the combiner 203 is a pseudorandom (PN) code sequence 202. The combiner 203 combines the information signal 201 with the pseudorandom code sequence to produce a first combined signal 204. The combiner 203 in effect modulates the information signal 201 with the pseudorandom code sequence 202.

The first combined signal 204 is then fed as an input signal 205 into a first code modulator circuit 220-1.

Figure 3:
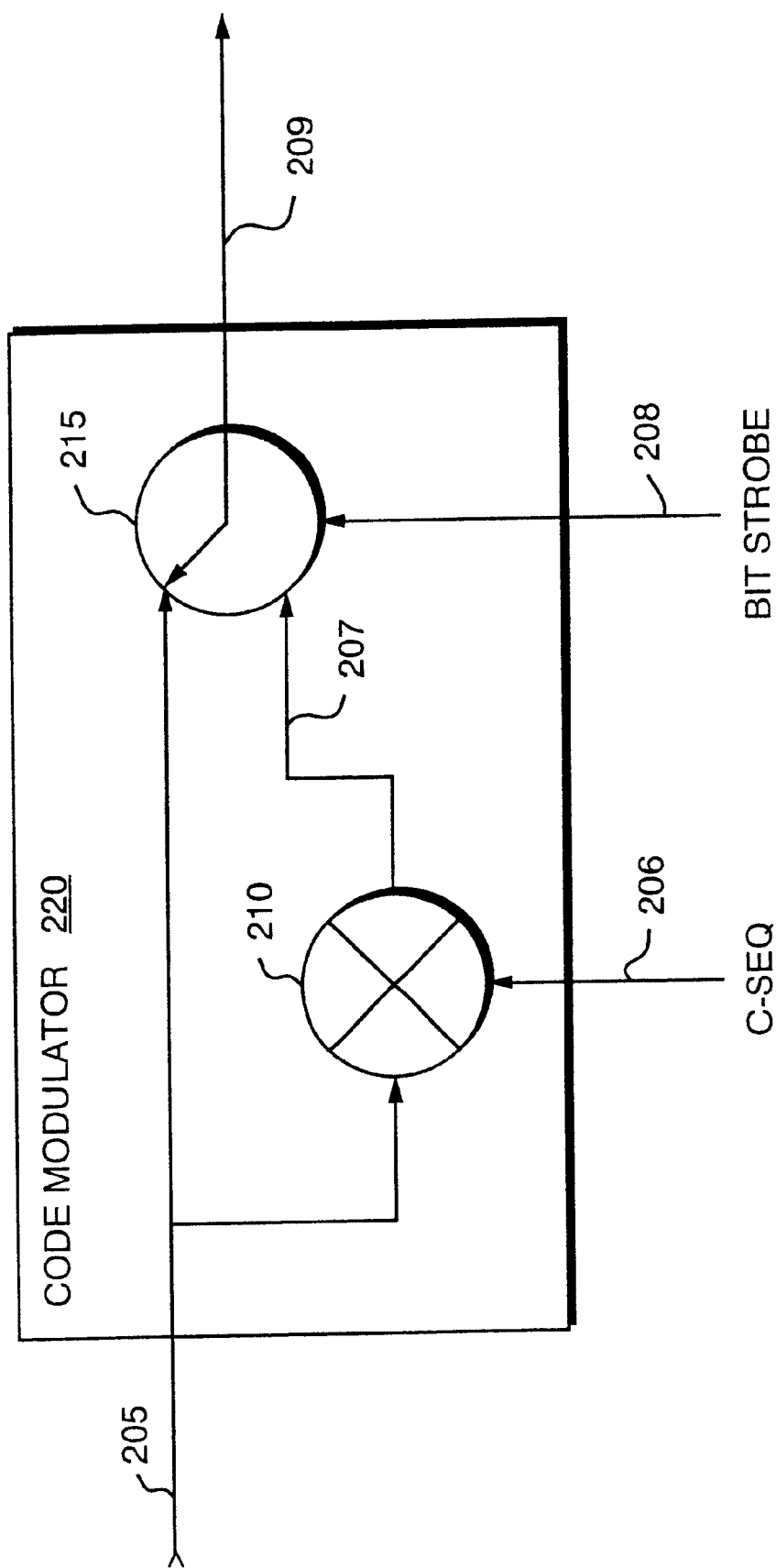
FIG. 3 is a diagram illustrating how a cascade arrangement of three code modulators is used to generate coded signals at different rates.

FIG. 3 illustrates an exemplary code modulator 220 in greater detail. Within the code modulator 220, the input signal 205 is fed to each of a channel sequence combiner 210 and a selector 215. The channel sequence combiner 210 receives the input signal 205 and also receives a channel sequence 206. Preferably, the channel sequence 206 is a repetitive maximum length pseudorandom (PN) channel sequence. The channel sequence combiner 210 combines the input signal 205 with the repetitive maximum length channel sequence 206. As a result of this modulation, the channel sequence combiner 210 outputs a channel sequence combined signal. The channel sequence combined signal 207 represents the input signal 205 modulated with the channel sequence 206.

The channel sequence combined signal 207 is also fed to the selector 215. The selector 215 also receives as input a repetitive bit strobe signal 208. Based upon the value of the repetitive strobe signal 208, the selector 215 selects one of either the input signal 205 or the channel sequence combined signal 207 to produce an output coded signal 209. The code modulator circuit 220 then feeds the output coded signal 209 as a resultant signal.

The period of the repetitive bit strobe signal 208 is of a length which is one bit greater than the repetitive maximum length channel sequence 206. By way of example, if the channel sequence 206 has a period of three bits in length (i.e. 111, 011, 101, 110), the bit strobe signal 208 has a period of at least four bits (i.e., 0001). Generalizing to the case of a $2^N-1$ bit long channel sequence, the bit strobe signal will be $2^N$ bits long. As such, an entire set of channel sequences 206 can be cycled through, at which point the strobe signal 208 will be activated to select the input signal 205 instead of the channel sequence combined signal 207.

In this manner, code modulation occurs only for each channel sequence 206, and then, when all channel sequence values have occurred, the selector 215 selects for transmission (i.e., selects as the output coded signal 209) the input signal 205 instead of the channel sequence signal 207.

By properly choosing values for both the channel sequence 206 and strobe signal 208, the output coded signal 209 will be orthogonal in nature as compared to another signal created using a corresponding, but offset code channel sequence 206.

Table 1 below illustrates the relationship between the channel sequence values 206 and the repetitive bit strobe signal values 208.

203, and the selector 215 will select as output the channel sequence combined signal 207, before the repetitive bit strobe signal 208 changes to a "1" or high signal. A high or "1" bit strobe signal value 208 then causes the selector 215 to switch states and select the input signal 205, rather than the channel sequence combined signal 207.

In this manner, the majority of the time the resultant output signal 209 will be selected via bit strobe 208 in a low state (i.e., will select the channel sequence combined signal 207), and will thus include the modulated channel sequence 206. But each fourth cycle of the bit strobe 209 will cause the input signal 205 to be output which does not include the channel sequence value 206.

Returning now to FIG. 2, a coded signal generator 230 that uses a cascading arrangement of three code modulators 220-1, 220-2 and 220-3 can be better understood. The cascaded arrangement provides the ability to generate a non-interfering signal that may be transmitted with many other non-interfering signals which may be at different coding rates. In particular, the illustrated cascaded code modulators 220-1, 220-2, and 220-3 produce a final coded output signal 250 which can be transmitted with as many as one hundred twenty-eight (128) other non-interfering coded signals at different code rates.

Each code modulator 220-1, 220-2, and 220-3 operates essentially the same as the code modulator 220 illustrated in FIG. 3. The difference is that each code modulator 220 in FIG. 2 is connected in a serial cascading manner so that, for example, the output signal 209-1 of the first code modulator 220-1 is received as input 205-2 to the second code modulator 220-2 and the output 201-2 of the second 220-2 is received as input 205-3 by the third 220-3, and so forth.

As illustrated in FIG. 2 and now also considering the timing diagram in FIG. 4, each of the respective code modulators 220-1, 220-2, and 220-3 has associated with it a different channel sequence signal (CS) and bit strobe signal. In particular, the first mode modulator 220-1 has a channel sequence and bit strobe signal (SS) selected as previously described in connection with FIG. 3. However, the second code modulator 220-2 in the cascade receives a time deci-

TABLE 1

Channel Sequence 206 in Relation to Bit Strobe Sequence 208

| C | 1 | 1 | 1 | 1 | 1 | 0 | 1 | 0 | 1 | 0 | 1 | 1 | 1 | 1 | 1 | 1 | 0 |
| B | 0 | 0 | 0 | 1 | 0 | 0 | 0 | 1 | 0 | 0 | 0 | 1 | 0 | 0 | 0 | 1 | 0 |

In Table 1, the top row is labeled "C" and represents the values of channel sequence 206. In this example, the channel sequence 206 is a 3-bit rolling code, having values of 111, 110, 101, 011. Note that the value 000 is not used. After the final 011 value, the channel sequence repeats itself beginning again with 111.

The value of the repetitive bit strobe signal 208 is represented in Table 1 by the "B" row. The bit strobe 208 has a repetitive value of 0001, and endlessly repeats during the operation of information modulation circuit 230.

In this example the bit strobe is four bits long and the channel sequence strobe is three bits. Accordingly, at times when the repetitive bit strobe signal 208 has a zero, "0," or low value, the selector 215 selects the second combined signal 207. There are three low or "0" values in a row for the repetitive bit strobe signal 208. As such, the channel sequence combiner 210 is able to modulate three successive channel sequence bits 206 with the first combined signal mated version of the channel sequence C-SEQ fed to the first code modulator 220-1. In this instance, the decimation is made by a factor of four so that the channel sequence (CS2) 206-2 fed to the second code modulator 220-2 is at a rate which is four times slower than the rate of that applied to the first code modulator 220-1. In addition, the bit strobe (SS2) 208-2 applied at the signal strobe input SS2 for the second code modulator 220-2 is provided at one-fourth of the rate of the bit strobe SS1 applied to the first code modulator 220-1.

In an analogous fashion, the channel sequence (CS3) 206-3 applied to the third cascaded code modulator 220-3 is obtained by decimating the channel sequence C-SEQ by a factor of sixteen. Similarly, the associated bit strobe (SS3) 208-3 is provided at one-sixteenth the rate of the bit strobe SS1 associated with the first code modulator 220-1.

Figure 5:
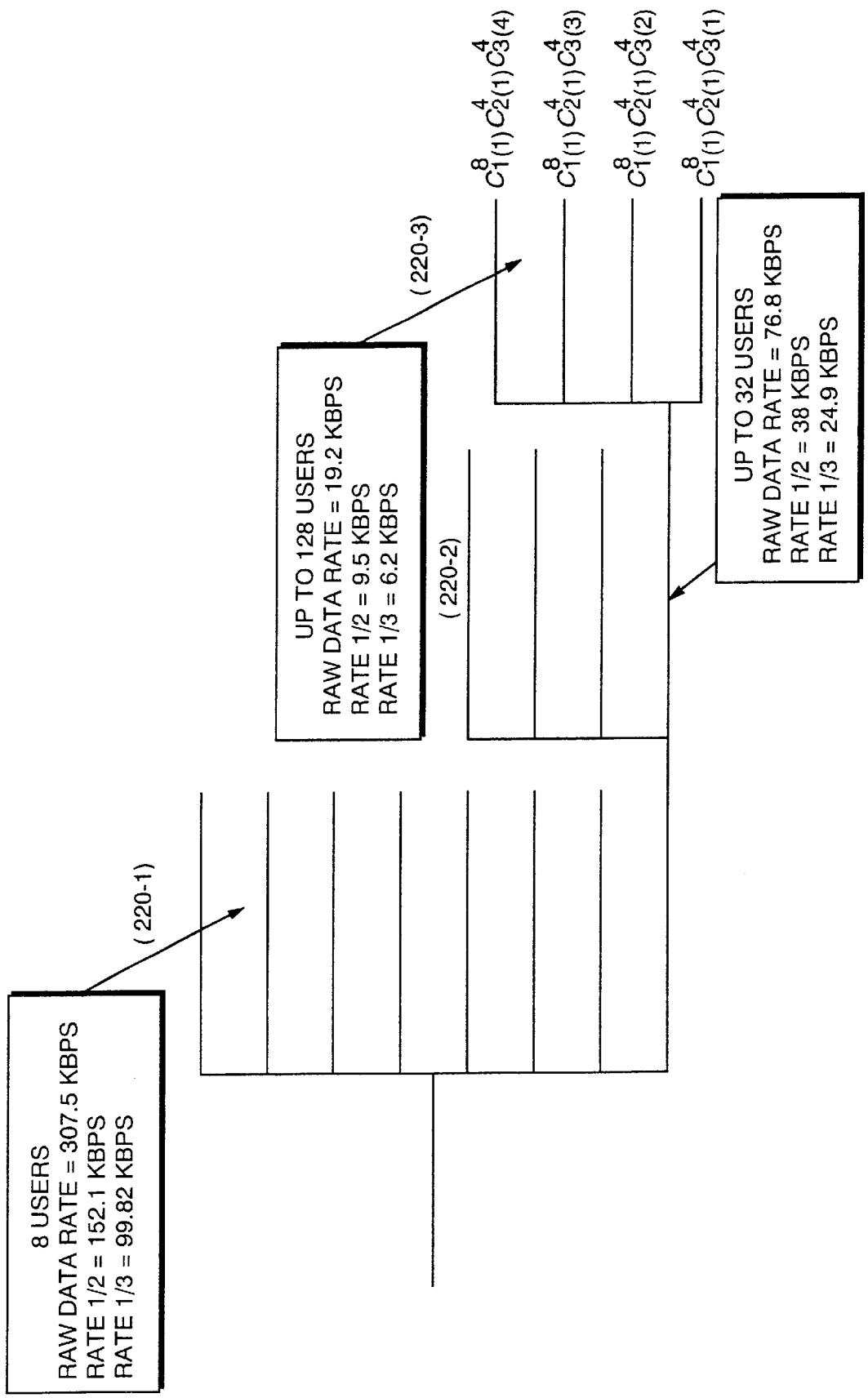
FIG. 5 is a block diagram of a signal generation system that allows up to four information signals to be simultaneously transmitted on a common frequency without interference.

FIG. 5 is a diagram which illustrates the how the cascading arrangement of code modulators 220-1, 220-2, and 220-3 provides different codes at different levels in the cascade with different data rates. The generated signals are non-interfering with each other and none are generated using orthogonal codes or orthogonal code generators.

In this particular embodiment, the PN code sequence 206-1 for the first code modulator 220-1 is selected as one of eight (8) different codes. In this embodiment, the basic raw code rate is 307.5 kilobits per second (kbps). This in turn is divided down by the second level code modulator 220-2 which selects one of four possible code sequences 206-2. The result is thirty-two (32) different raw data rate codes each at 76.8 kbps. In the third stage, this is divided by four again to provide raw data rate codes 206-3 at 19.2 kbps, for a total possibility of one hundred twenty-eight (128) different codes.

It should be understood that different users may make use of codes specified at different rates of the cascade. As illustrated, seven users may be allocated the first seven codes produced by first stage code modulators 220-1, wherein each such user has a raw data rate of 307.5 kbps. Then the system would also accommodate up to sixteen additional users, each at the data rate of 19.2 kbps, wherein each of these additional coded signals is provided by the third stage of the cascade. Every user's coded signal remains orthogonal to other user's coded signals despite the fact that the different codes are at different rates, e.g., seven are coded at 307.5 kbps and the sixteen others at 19.2 kbps.

In addition to the raw rate codes, half-rate and third-rate codes may be provided as shown in the cascade by providing a rate-reduced code at the respective first level of the cascade. This is accomplished via the use of Forward Error Correction (FEC) type codes such as product codes or turbo codes.

In this manner, data rates may be selected to adapt to specific user's channel conditions. For example, relatively good channels with low observed multipath distortion may be assigned relatively higher speed code rates, providing higher capacity for such users. Conditions indicating poor channel transmission characteristics with, for example, significant multipath distortion may be assigned channels with lower coding rates. Different user demands can thus be accommodated in the same system simultaneously at the same frequency while still maintaining orthogonality between the coded different user signals.

Figure 6:
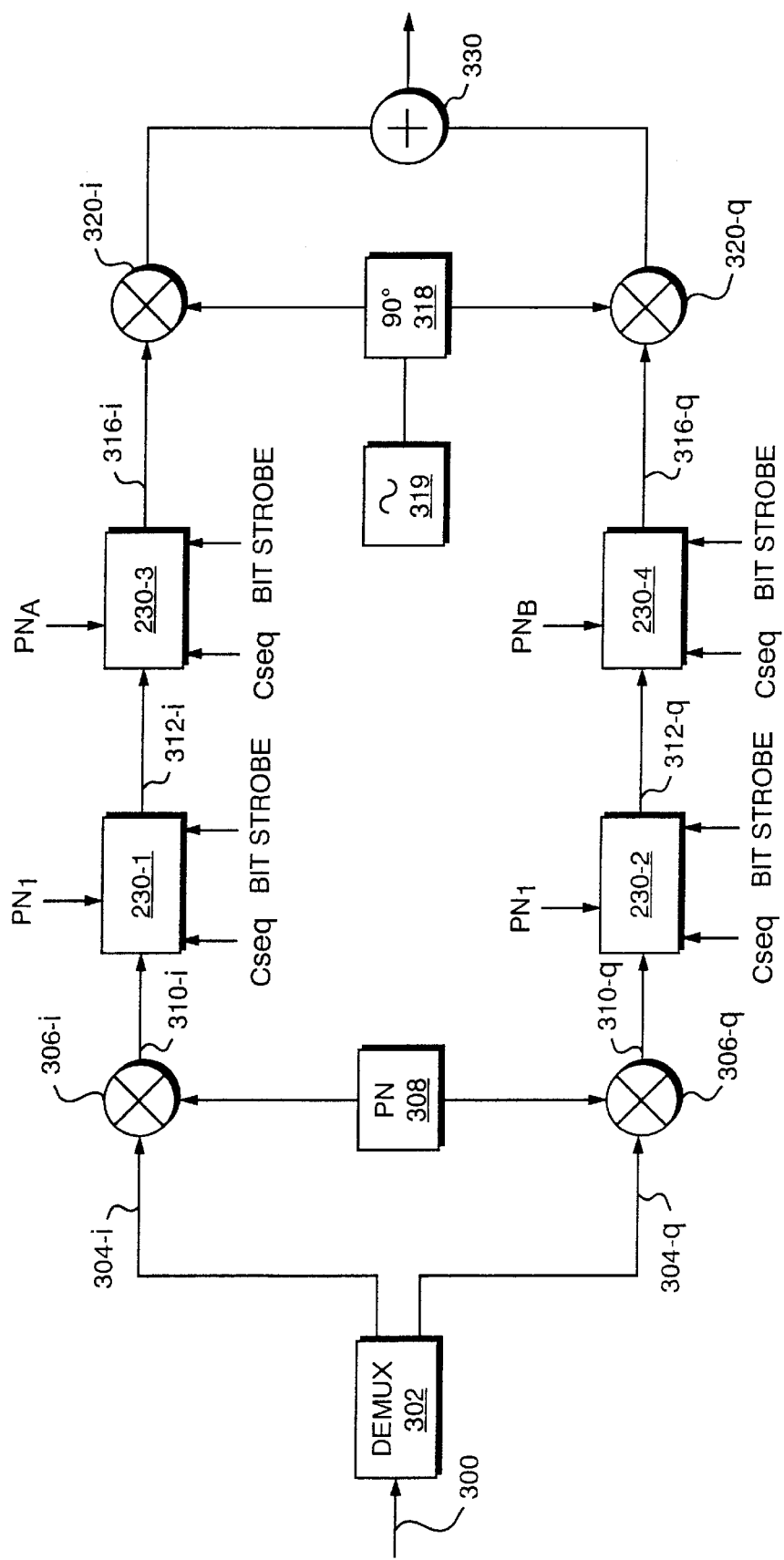
FIG. 6 is a block diagram of an in-phase and quadrature modulator implementation using the encoder.

During the operation of the coded signal generator 230, the resultant coded output signal 250 may be combined with other resultant output signals created with other coded signal generators 230. FIG. 6 illustrates one application of this principle. In this example, multiple coded signal generators 230 are used to produce an output radio frequency signal 330 from an input data signal 300. In particular, the input data signal 300 is first fed to a de-multiplexer 302 to separate it into two individual information streams, a first information stream 304-i and a second information stream 304-q, respectively representing an in-phase and quadrature signal path. The de-multiplexer 302 therefore rate-reduces the information stream by one-half. For example, if the input signal 300 is sampled at a rate R, the two resulting de-multiplexed signals 304-i and 304-q are respectively sampled at a rate R+2.

A first stage coding process is then applied to both signal paths. For example, a pseudonoise (PN) code generator 308 generates a long PN code and applies this same PN code to each of the signal paths. A first combiner 306-i combines the long PN code generated by the in-phase signal 304-i, and a second combiner 306-q combines the long PN code with the quadrature signal 304-q. The resulting in-phase modulated signal 310-i is next applied to a first coded signal generator 230-1. Similarly, the quadrature signal 310-q is fed to another coded signal generator 230-2. The short PN codes $PN_1$ are then applied to each of the code generators 230-1 and 230-2. The short PN codes are the same for both the in-phase channel and quadrature channel. The channel sequences applied to each of the coded generators 230-1 and 230-2 are also the same. The net result is that the in-phase coded signal 312-i and the quadrature coded signal 312-q have been affected by the same spreading code sequence.

In the next step of the process, a second coded signal generator 230-3 and 230-4 are applied respectively to each of the in-phase and quadrature signal paths. The in-phase coded generator 230-3 thus takes the in-phase coded signal 312-i, producing in-phase second stage signal 316-i. Similarly, the coded signal generator 230-4 accepts the quadrature coded signal 312-q and produces a second stage quadrature signal 316-q. The pseudonoise codes applied by the second stage coded signal generators 230-3 and 230-4 use different pseudonoise code sequences, $PN_A$ and $PN_B$, respectively. As a result, the finally coded signals 316-i and 316-q are essentially orthogonal with respect to one another. This orthogonality is accomplished without the use of orthogonal codes or orthogonal code generators, and simply by making use of the bit strobe augmented PN sequence coded signal generators 230 as previously described.

In a final stage of processing, the final coded in-phase signal 316-i and quadrature signal 316-q are fed to a modulator 330. The modulator 330 impresses a radio frequency modulation on the respective input signals using known modulation techniques. For example, the illustrated quadrature modulator makes use of a oscillator 319, quadrature phase shifter 318, in-phase and quadrature modulators 320-i and 320-q, and summer 330 in a manner which is well known in the art.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system for encoding an information signal to produce a resultant output signal comprising:

a plurality of code modulators, each code modulator receiving a respective input signal and generating a respective output signal, the code modulators arranged in a series cascade such that the information signal is fed as an input signal to a first code modulator and an output signal of the first code modulator is fed as an input signal to a second code modulator, and wherein an output signal from a final code modulator is used as the respective output signal, and wherein each code modulator further comprises:

a channel sequence combiner receiving the respective input signal, and receiving a respective channel sequence, the channel sequence combiner combining the respective input signal with the channel sequence signal to produce a respective combined signal; and a selector coupled to receive the respective input signal, the respective combined signal and a repetitive strobe signal, the selector selecting one of the respective input signal and the respective combined signal to produce the respective output signal based upon a value of the repetitive strobe signal, wherein the repetitive strobe signal is of a length greater than the channel sequence signal.

2. The system of claim 1 further comprising:
a pseudorandom combiner receiving the information signal and a pseudorandom code sequence signal, the pseudorandom combiner combining the information signal with the pseudorandom code sequence signal to produce the respective input signal for the first code modulator.

3. The system of claim 1 wherein:
the repetitive channel sequence is a repeating maximal length pseudorandom noise sequence of length $2^N-1$ and wherein the repetitive strobe signal is a repeating bit sequence of at least length $2^N$; and
wherein bits 0 through $2^N-1$ of the repetitive strobe signal cause the selector to select the respective combined signal as the respective output signal and wherein bit $2^N$ of the repetitive strobe signal selects the respective input signal as the respective output signal.

4. The system of claim 3 wherein during the operation of each cycle of both the channel sequence combiner and the selector, a bit from each of the channel sequence and the repetitive strobe signal are processed respectively, such that during processing of the first bit of a start of a next cycle of bits from the channel sequence by the channel sequence combiner, the selector is processing the last bit of the repetitive strobe signal.

5. The system of claim 1 wherein the channel sequence signal connected to a second code modulator in the series cascade of code modulators is rate-decimated such that its respective bit rate is an integral divisor of a bit rate for the channel sequence signal connected to the first code modulator.

6. A spread spectrum communications system allowing transmission of a non-interfering information signal over a common carrier frequency, the system comprising:
an in-phase signal processing circuit comprising:
a first pseudorandom combiner receiving the information signal and an in-phase (I) pseudorandom code sequence, the first pseudorandom combiner combining the information signal with the in-phase (I) pseudorandom code sequence to produce an in-phase combined signal;
a first in-phase encoding circuit comprising a plurality of code modulators, each code modulator receiving a respective input signal and generating a respective output signal, the code modulators arranged in a series cascade such that the in-phase combined signal is fed as an input signal to a first code modulator and an output signal of the first code modulator is fed as a input signal to a second code modulator, and wherein an output signal from a final code modulator is used as a respective in-phase output signal, wherein each code modulator further comprises:
a channel sequence combiner receiving the respective input signal and receiving a channel sequence signal, the first channel sequence combiner combining the respective combined signal;
a selector coupled to receive the respective input signal, the respective combined signal and a repetitive strobe signal, the selector selecting one of the respective input signal and the respective combined signal to produce the respective output signal based upon a value of the repetitive strobe signal, wherein the repetitive strobe signal is of a length greater than the channel sequence signal; and
a quadrature signal processing circuit comprising:
a second pseudorandom combiner receiving the information signal and a quadrature-phase (Q) pseudorandom code sequence, the second pseudorandom combiner combining the information signal with the quadrature-phase (Q) pseudorandom code sequence to produce an quadrature-phase combined signal;
a first quadrature-phase encoding circuit comprising a plurality of code modulators, each code modulator receiving a respective input signal and generating a respective output signal, the code modulators arranged in a series cascade such that the in-quadrature combined signal is fed as a input signal to a first code modulator and an output signal of the first code modulator is fed as an input signal to a second code modulator, and wherein an output signal from a final code modulator is used as a respective in-quadrature output signal, wherein each code modulator further comprises:
a channel sequence combiner receiving the respective input signal and receiving a channel sequence signal, the second channel sequence combiner combining the respective input signal with the channel sequence signal to produce a respective combined signal; and
a selector coupled to receive the respective channel sequence signal and the repetitive strobe signal, the second selector selecting one of the respective input signal and the channel sequence signal to produce the respective output signal based upon a value of the repetitive strobe signal;
an oscillator producing an oscillation signal;
a phase splitter accepting the oscillation signal and dividing the oscillation signal into first and second phase shifted signals;
a first modulator accepting the first modulated signal and the first phase shifted signal to produce a first summation signal;
a second modulator accepting the second modulated signal and the second phase shifted signal to produce a second summation signal; and
a summation circuit accepting and combining the first and second summation signals to produce a non-interfering modulated user information signal.

7. The spread spectrum communications system of claim 6 wherein the first and second modulators use bipolar phase shift keyed modulation.

8. The spread spectrum communications system of claim 6 wherein the first and second code modulators use the same channel sequence signal and repetitive strobe signal.

9. A method for modulating an information signal in a spread spectrum communication system comprising the steps of:
performing a plurality of code modulation steps such that each code modulation step operates on a respective input signal to produce a respective output signal, the code modulation steps in a series such that the information signal is used as an input to a first code modulation step and an output signal from the first code modulation step is fed as an input signal to a second code modulation step, and wherein an output signal from one of the code modulation steps is used as a respective output encoded information signal, and wherein each code modulation step further comprises:
combining a respective input signal with a channel sequence signal to produce a combined signal; and
selecting one of the respective input signal and the combined signal to produce a respective output signal, said selecting based upon a value of a repetitive strobe signal of a length greater than the channel sequence signal.

10. The method of claim 9 further comprising the step of:
before combining the respective input signal in the first code modulation step, receiving the information signal and combining the information signal with a pseudo-random code sequence to produce the respective input signal for the first code modulation step.

* * * * *